(12) United States Patent
Lai

(10) Patent No.: US 9,648,693 B1
(45) Date of Patent: May 9, 2017

(54) PLANAR LIGHT ILLUMINATION DEVICE

(71) Applicant: Chung-Ping Lai, Zhubei (TW)

(72) Inventor: Chung-Ping Lai, Zhubei (TW)

( * ) Notice: Subject to any disclaimer, the term of this patent is extended or adjusted under 35 U.S.C. 154(b) by 0 days.

(21) Appl. No.: 15/016,264

(22) Filed: Feb. 5, 2016

(51) Int. Cl.
*H05B 37/02* (2006.01)
*F21V 7/00* (2006.01)
*H05B 33/08* (2006.01)
*F21V 8/00* (2006.01)

(52) U.S. Cl.
CPC ....... *H05B 33/0854* (2013.01); *F21V 7/0066* (2013.01); *G02B 6/0083* (2013.01); *H05B 33/0872* (2013.01); *H05B 37/0218* (2013.01); *H05B 37/0272* (2013.01); *H05B 37/0281* (2013.01)

(58) Field of Classification Search
CPC .... F21K 9/00; F21Y 2115/10; F21Y 2103/10; F21Y 2105/10; F21Y 2105/00; G06K 7/10732; G06K 2207/1018; H05B 33/0842; H05B 33/0866; H05B 33/0869; G02F 1/133615; G02F 1/1336; G09G 3/3406; G02B 6/0096
See application file for complete search history.

(56) References Cited

U.S. PATENT DOCUMENTS

| | | | | |
|---|---|---|---|---|
| 7,164,810 B2* | 1/2007 | Schnee | ................ | G06K 9/2009 235/462.01 |
| 7,510,300 B2* | 3/2009 | Iwauchi | ............... | G09G 3/3406 315/149 |
| 8,783,901 B2* | 7/2014 | Zoorob | .................... | F21K 9/00 257/103 |
| 8,896,766 B2* | 11/2014 | Tatsumi | ................ | H04N 17/00 345/102 |

* cited by examiner

*Primary Examiner* — Vibol Tan

(57) ABSTRACT

A planar light illumination device contains: a light guiding plate, an ambient light sensor (ALS), and a controller. The light guiding plate includes a first light emitting unit and a second light emitting unit. The first light emitting unit has a first light emitter and a second light emitter, a color temperature of which is different from the first light emitter, and the second light emitting unit has a third light emitter and a fourth light emitter, a color temperature of which is different from the third light emitter. The ALS senses a color temperature of ambient lights, transforms the color temperature into a first color-temperature signal, and transmits the first color-temperature signal. The controller is electrically connected with the first and second light emitters of the first light emitting unit, the third and fourth light emitters of the second light emitting unit, and the ALS.

12 Claims, 5 Drawing Sheets

PLANAR LIGHT ILLUMINATION DEVICE

FIELD OF THE INVENTION

The present invention relates to a planar light illumination device which adjusts colors of plural light emitters and changes brightness of the plural light emitters.

BACKGROUND OF THE INVENTION

A conventional illumination device emits lights like natural lights, such as sunlight. It is to be noted that color temperature of the sunlight in noon is around 5500K, color temperature of the sunlight in the morning and the afternoon is about 2700K to 4000K.

However, the color temperature of the conventional illumination device is fixed and cannot be changed based on using requirements. For example, color temperature of incandescent bulb is around 2800K, color temperature of yellow fluorescent lamp is around 3500K, and color temperature of daylight fluorescent lamp is around 6500K.

The present invention has arisen to mitigate and/or obviate the afore-described disadvantages.

SUMMARY OF THE INVENTION

The primary objective of the present invention is to provide a planar light illumination device which adjusts colors of plural light emitters and changes brightness of the plural light emitters.

To obtain above-mentioned objective, a planar light illumination device provided by the present invention contains: a light guiding plate, an ambient light sensor (ALS), and a controller.

The light guiding plate includes a first light emitting unit and a second light emitting unit which are symmetrically arranged on two input sides of the light guiding plate, respectively, wherein the first light emitting unit has a first light emitter and a second light emitter, a color temperature of which is different from the first light emitter, and the second light emitting unit has a third light emitter and a fourth light emitter, a color temperature of which is different from the third light emitter.

The ambient light sensor (ALS) is configured to sense a color temperature of ambient lights, to transform the color temperature into a first color-temperature signal, and to transmit the first color-temperature signal.

The controller is electrically connected with the first light emitter and the second light emitter of the first light emitting unit, the third light emitter and the fourth light emitter of the second light emitting unit, and the ALS. The controller drives the first light emitter and the second light emitter of the first light emitting unit, the third light emitter and the fourth light emitter of the second light emitting unit to illuminate the lights and changes brightness of the first light emitter, the second light emitter, the third light emitter, and the fourth light emitter based on the first color-temperature signal sensed by the ALS.

DETAILED DESCRIPTION OF THE PREFERRED EMBODIMENTS

Figure 1:
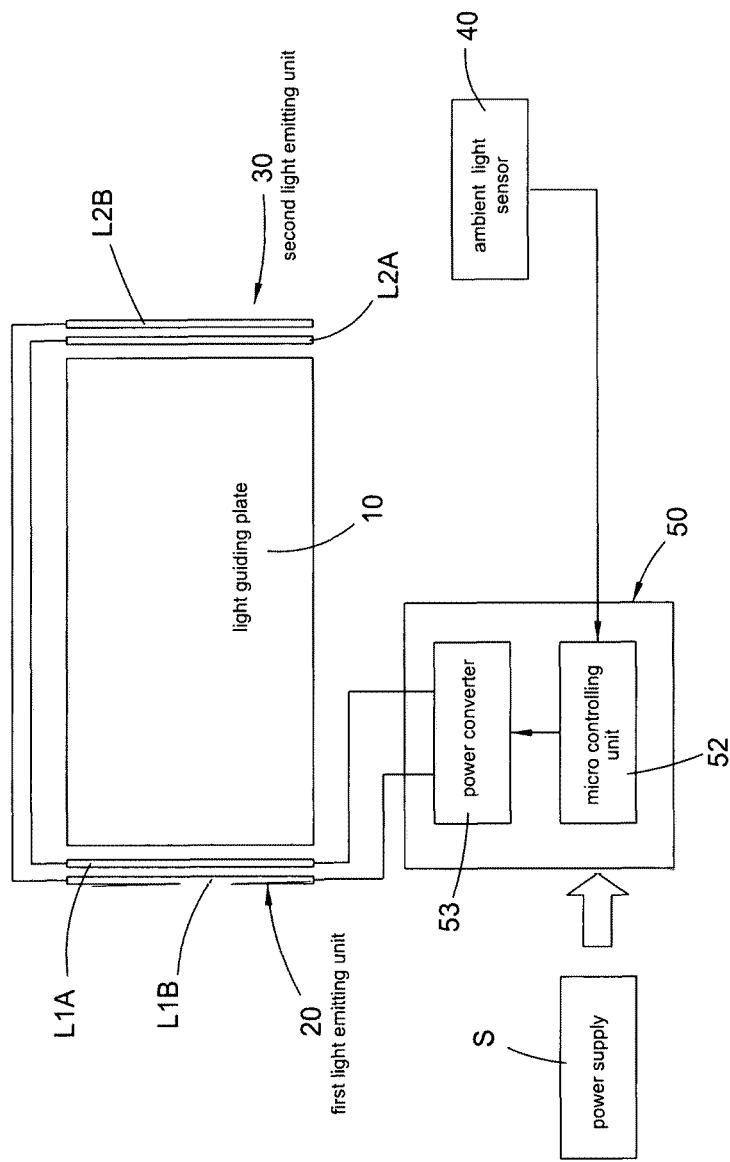
FIG. 1 is a block diagram showing the function of a planar light illumination device according to a first embodiment of the present invention.
Figure 2:
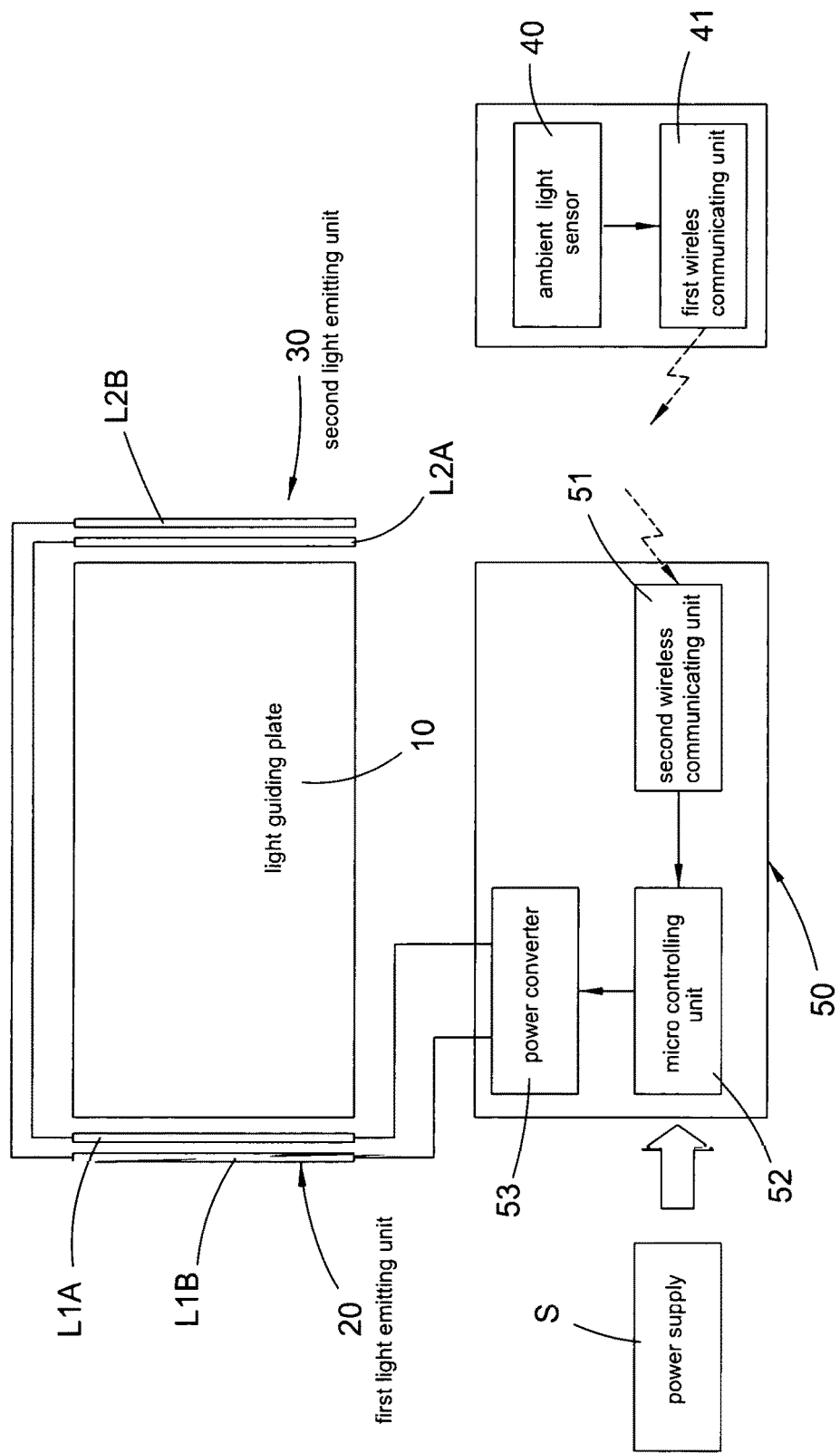
FIG. 2 is a block diagram showing the function of a planar light illumination device according to a second embodiment of the present invention.

With reference to FIG. 1, a planar light illumination device according to a first embodiment of the present invention comprises:

a light guiding plate 10 including a first light emitting unit 20 and a second light emitting unit 30 which are symmetrically arranged on two input sides of the light guiding plate 10, respectively, wherein the first light emitting unit 20 has a first light emitter L1A and a second light emitter L1B, a color temperature of which is different from the first light emitter L1A, and the second light emitting unit 30 has a third light emitter L2A and a fourth light emitter L2B, a color temperature of which is different from the third light emitter L2A and is identical to the second light emitter L1B, such that the light guiding plate 10 guides and transmits lights outwardly from the first light emitter L1A, the second light emitter L1B, the third light emitter L2A, and the fourth light emitter L2B;

an ambient light sensor (ALS) 40 configured to sense a color temperature of ambient lights, to transform the color temperature into a first color-temperature signal, and to transmit the first color-temperature signal; and a controller 50 electrically connected with the first light emitter L1A and the second light emitter L1B of the first light emitting unit 20, the third light emitter L2A and the fourth light emitter L2B of the second light emitting unit 30, and the ALS 40; wherein the controller 50 drives the first light emitter L1A and the second light emitter L1B of the first light emitting unit 20, the third light emitter L2A and the fourth light emitter L2B of the second light emitting unit 30 to illuminate the lights and changes brightness of the first light emitter L1A, the second light emitter L1B, the third light emitter L2A, and the fourth light emitter L2B based on the first color-temperature signal sensed by the ALS 40.

In this embodiment, each of the first light emitter L1A, the second light emitter L1B, the third light emitter L2A, and the fourth light emitter L2B is light emitting diode (LED). In another embodiment, the first light emitting unit 20 has the first light emitter L1A with a color temperature of 2700K and has the second light emitter L1B with a color temperature of 6500K, and the second light emitting unit 30 has the third light emitter L2A with a color temperature of 2700K and has the fourth light emitter L2B with a color temperature of 6500K, such that operation (such as emitting the lights or not emitting the lights) and brightness of the first light emitter L1A, the second light emitter L1B, the third light emitter L2A, and the fourth light emitter L2B are controlled by the controller 50. Preferably, a color temperature of each of the first light emitter L1A, the second light emitter L1B, the third light emitter L2A, and the fourth light emitter L2B is changeable based on using requirements.

In addition, each of the first light emitter L1A, the second light emitter L1B, the third light emitter L2A, and the fourth light emitter L2B illuminates the lights of different colors (such as white, red, blue, green lights, and a combination of the white, red, blue, and green lights) respectively so as to produce various lighting modes, such as clear-sky lighting mode or green-leaf lighting mode. In application, the planar light illumination device is an illuminative lamp or a decorative lamp mounted on a ceiling or a wall so as to emit the lights in the clear-sky lighting mode or in the green-leaf lighting mode. Preferably, the planar light illumination device emits the lights with varied colors and brightness from its first side to a second side thereof.

Figure 3:
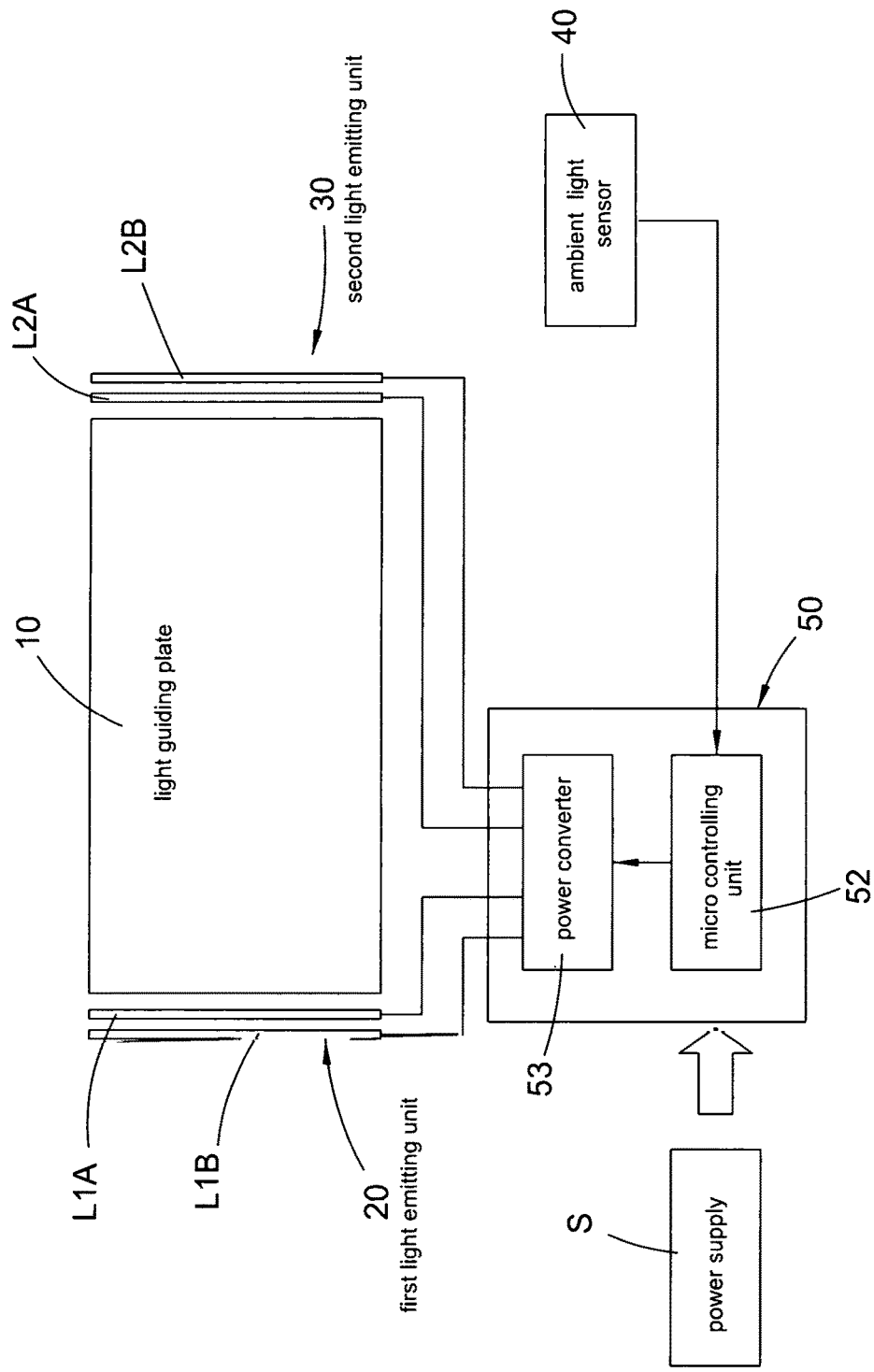
FIG. 3 is a block diagram showing the function of a planar light illumination device according to a third embodiment of the present invention.
Figure 4:
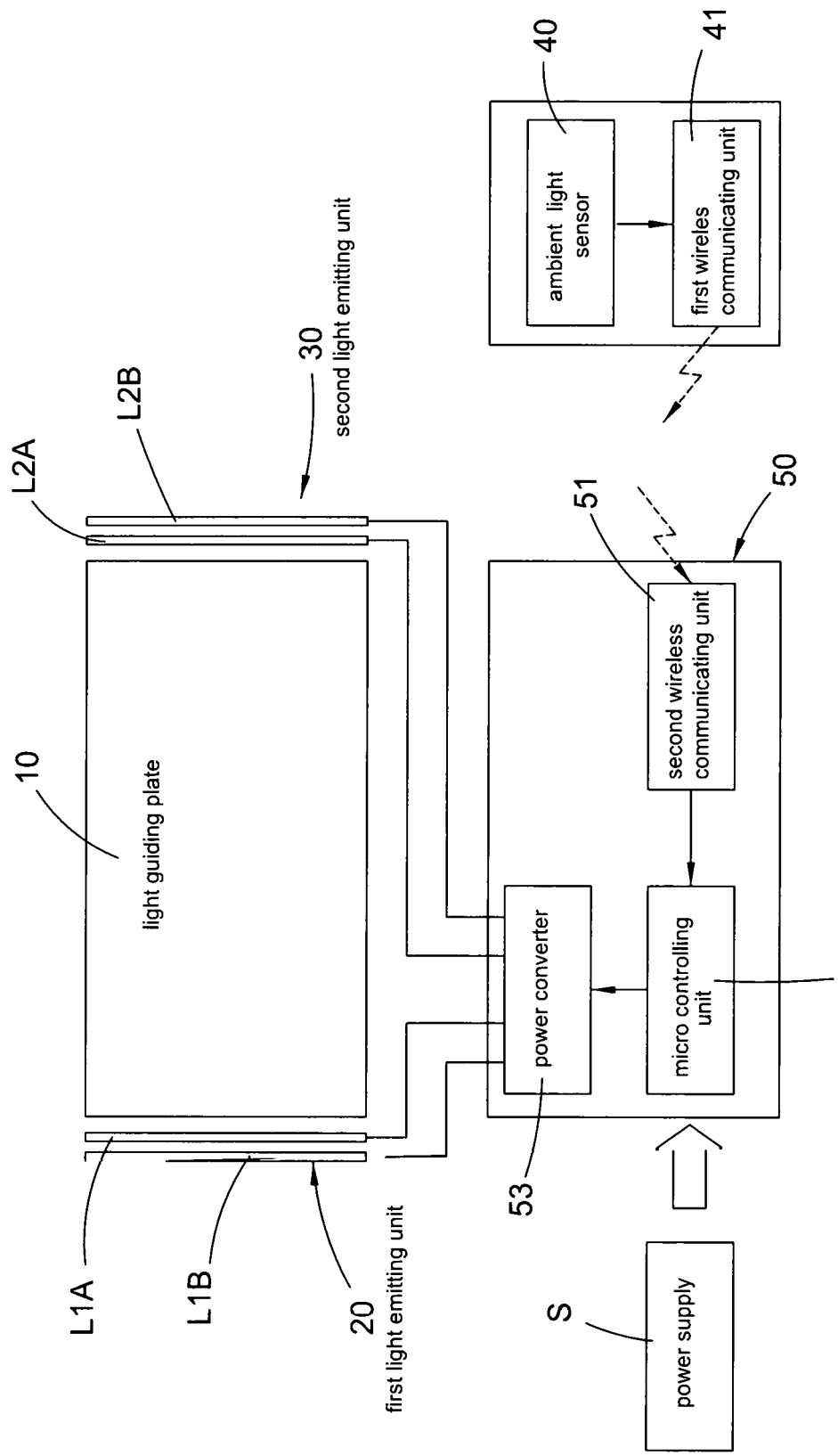
FIG. 4 is a block diagram showing the function of a planar light illumination device according to a fourth embodiment of the present invention.

The ALS 40 is configured to sense a color temperature of the ambient lights, to convert the color temperature into the first color-temperature signal, and to send the first color-temperature signal to the controller 50. As shown in FIGS. 1 and 3, the ALS 40 is electrically connected with the controller 50. In a second embodiment, the ALS 40 is electrically connected with the controller 50 in a wireless communication manner, wherein the ALS 40 has a first wireless communicating unit 41, and the controller 50 has a second wireless communicating unit 51 which transmits signals to the first wireless communicating unit 41, wherein each of the first wireless communicating unit 41 and the second wireless communicating unit 51 is a bluetooth communicator, such as a bluetooth low energy module (BLE module).

The controller 50 is a digital controller and includes a micro controller unit (MCU) 52 and a power converter 53, and an input end of the power converter 53 is electrically connected with a power supply S (such as a constant-voltage power supply), and an output end of the power converter 50 is electrically connected with the first light emitter L1A and the second light emitter L1B of the first light emitting unit 20 and the third light emitter L2A and the third light emitter L2B of the second light emitting unit 30. The power convert 53 is a DD converter, the MCU 52 is electrically connected with the ALS 40 and produces pulse width modulation (PWM) based on the first color-temperature signal sensed by the ALS 40 and controls output mode (such as constant current or constant voltage) of the power converter 53 by using a pulse width modulation (PWM) signal, and the power converter 53 drives the first light emitter L1A, the second light emitter L1B, the third light emitter L2A and the fourth light emitter L2B to emit or not to emit the lights and to change brightness of the first light emitter L1A, the second light emitter LIB, the third light emitter L2A and the fourth light emitter L2B.

The controller 50 controls the first light emitter L1A of the first light emitting unit 20 and third light emitter L2A of the second light emitting unit 30 simultaneously or controls the second light emitter L1B of the first light emitting unit 20 and the fourth light emitter L2B of the second light emitting unit 30 simultaneously, and the controller 50 changes the brightness of the first light emitter L1A and the second light emitter L1B of the first light emitting unit 20 and the third light emitter L2A and the fourth light emitter L2B of the second light emitting unit 30. For example, the first light emitter L1A of the first light emitting unit 20 and the third light emitter L2A of the second light emitting unit 30 are electrically connected with the controller 50 in a series connecting manner (as shown in FIG. 1) or in a parallel connecting manner. The second light emitter L1B of the first light emitting unit 20 and the fourth light emitter L2B of the second light emitting unit 30 are electrically connected with the controller 50 in a series connecting manner (as shown in FIG. 1) or in a parallel connecting manner. The controller 50 drives the first light emitter L1A of the first light emitting unit 20 and the third light emitter L2A of the second light emitting unit 30 to emit the lights simultaneously or drives the second light emitter L1B of the first light emitting unit 20 and the fourth light emitter L2B of the second light emitting unit 30 to emit the lights simultaneously. For instance, the controller 50 drives the first light emitter L1A with 2700K and the third light emitter L2A with 2700K to emit the lights. Then, the controller 50 drives the third light emitter L1B with 6500K and the fourth light emitter L2B with 6500K to emit the lights. Thereafter, brightness of the first light emitter L1A, the second light emitter L1B, the third light emitter L2A, and the fourth light emitter L2B are changed.

Referring to FIG. 3, a difference of a planar light illumination device of a third embodiment from that of the first embodiment comprises: a controller 50 independently controlling any one of a first light emitter L1A and a second light emitter L1B of a first light emitting unit 20 and a third light emitter L2A and a fourth light emitter L2B of a second light emitting unit 30 to emit lights, not emit the lights, and change brightness. For instance, a half (i.e., the first light emitter L1A and the second light emitter L1B) of a light guiding plate 10 emits the lights and the other half (i.e., the third light emitter L2A and the fourth light emitter L2B) of the light guiding plate 10 does not emit the lights, such as sunshine or sunset lighting mode.

Figure 5:
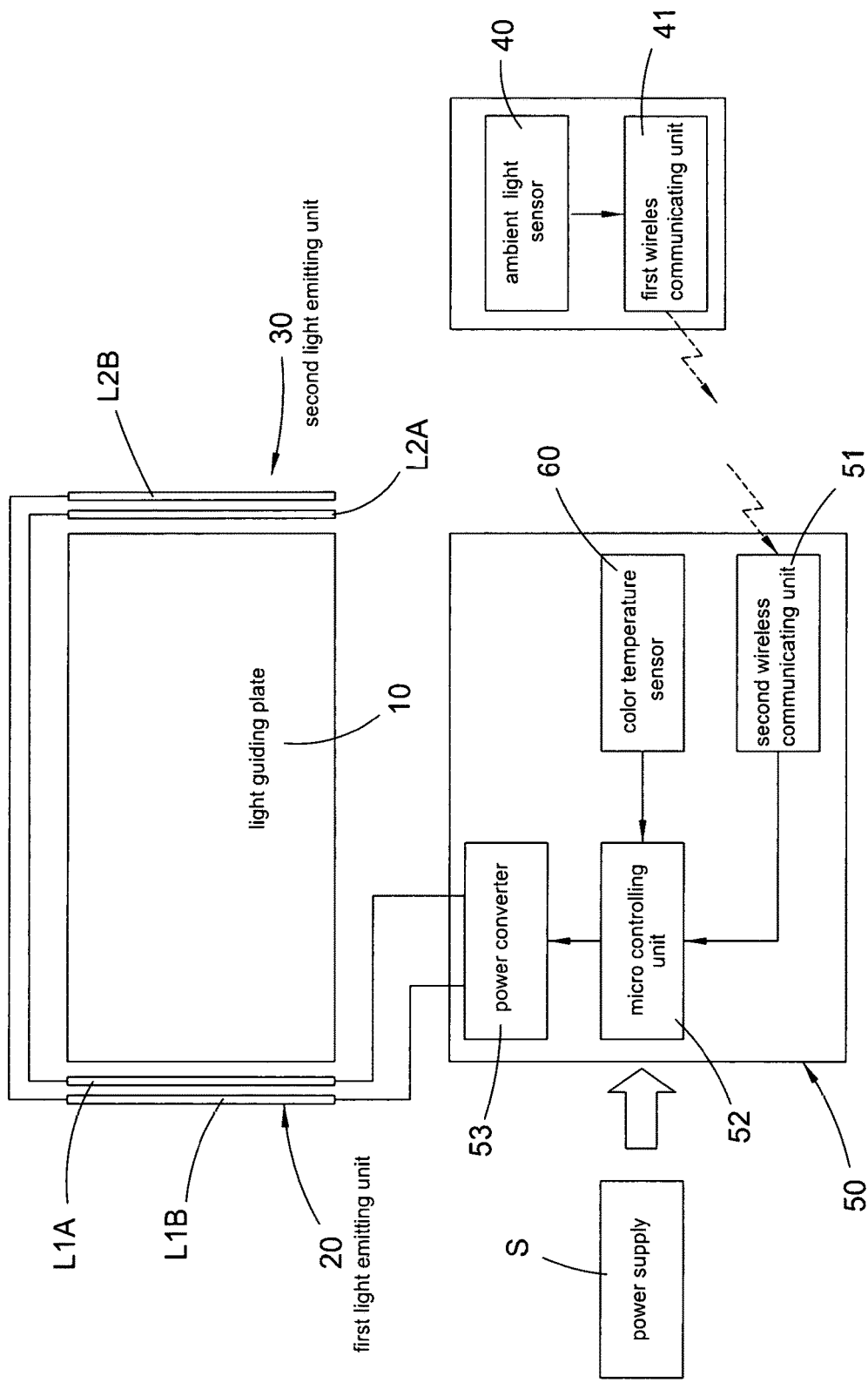
FIG. 5 is a block diagram showing the function of a planar light illumination device according to a fifth embodiment of the present invention.

As illustrated in FIG. 5, a difference of a planar light illumination device of a fourth embodiment from that of the first embodiment comprises: a color temperature sensor 60 electrically connected with the micro controlling unit 52 of the controller 50 and configured to sense color temperature of the lights of the first light emitter L1A, the second light emitter L1B, the third light emitter L2A, and the fourth light emitter L2B from the light guiding plate 10, to convert the color temperature into a second color-temperature signal and to send the second color-temperature signal to the micro controlling unit 52, the micro controlling unit 52 produces pulse width modulation (PWM) signal according to the second color-temperature signal sensed by the color temperature sensor 60, and an output mode of the converter 53 is adjusted via the pulse width modulation (PWM) signal to automatically compensate colors of the lights (i.e., the color temperature) from the light guiding plate 10.

In a fifth embodiment, the controller 50 controls a first light emitter L1A and a second light emitter L1B of a first light emitting unit 20 and a third light emitter L2A and a fourth light emitter L2B of a second light emitting unit 30 to operate (such as emitting lights or not emitting lights) and to change brightness of the first light emitter L1A, the second light emitter L1B, the third light emitter L2A, the fourth light emitter L2B based on a set time, thus achieving wake-up mode. In the wake-up mode, the brightness of the first light emitter L1A, the second light emitter L1B, the third light emitter L2A, and the fourth light emitter L2 increase gradually.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:
1. A planar light illumination device comprising:
  a light guiding plate including a first light emitting unit and a second light emitting unit which are symmetrically arranged on two input sides of the light guiding plate, respectively, wherein the first light emitting unit has a first light emitter and a second light emitter, a color temperature of which is different from the first light emitter, and the second light emitting unit has a third light emitter and a fourth light emitter, a color temperature of which is different from the third light emitter;

an ambient light sensor (ALS) configured to sense a color temperature of ambient lights, to transform the color temperature into a first color-temperature signal, and to transmit the first color-temperature signal; and a controller electrically connected with the first light emitter and the second light emitter of the first light emitting unit, the third light emitter and the fourth light emitter of the second light emitting unit, and the ALS; wherein the controller drives the first light emitter and the second light emitter of the first light emitting unit, the third light emitter and the fourth light emitter of the second light emitting unit to illuminate the lights and changes brightness of the first light emitter, the second light emitter, the third light emitter, and the fourth light emitter based on the first color-temperature signal sensed by the ALS.

2. The planar light illumination device as claimed in claim 1, wherein the first light emitting unit has the first light emitter with a color temperature of 2700K and has the second light emitter with a color temperature of 6500K, and the second light emitting unit has the third light emitter with a color temperature of 2700K and has the fourth light emitter with a color temperature of 6500K, wherein each of the first light emitter, the second light emitter, the third light emitter, and the fourth light emitter is light emitting diode (LED).

3. The planar light illumination device as claimed in claim 1, wherein the first light emitter, the second light emitter, the third light emitter, and the fourth light emitter illuminate the lights of different colors respectively.

4. The planar light illumination device as claimed in claim 3, wherein each of the first light emitter, the second light emitter, the third light emitter, and the fourth light emitter illuminates any one of white light, red light, blue light, green light, and a combination of the white, red, blue, and green lights, respectively.

5. The planar light illumination device as claimed in claim 1, wherein the controller includes a micro controller unit (MCU) and a power converter, and an input end of the power converter is electrically connected with a power supply, and an output end of the power converter is electrically connected with the first light emitter and the second light emitter of the first light emitting unit and the third light emitter and the third light emitter of the second light emitting unit, the MCU is electrically connected with the ALS and produces pulse width modulation (PWM) based on the first color-temperature signal sensed by the ALS and controls output mode of the power converter by using a pulse width modulation (PWM) signal, and the power converter drives the first light emitter, the second light emitter, the third light emitter and the fourth light emitter to emit or not to emit the lights and to change brightness of the first light emitter, the second light emitter, the third light emitter and the fourth light emitter.

6. The planar light illumination device as claimed in claim 1, wherein the controller controls the first light emitter of the first light emitting unit and the third light emitter of the second light emitting unit simultaneously or controls the second light emitter of the first light emitting unit and the fourth light emitter of the second light emitting unit simultaneously, and the controller changes the brightness of the first light emitter and the second light emitter of the first light emitting unit and third light emitter and the fourth light emitter of the second light emitting unit.

7. The planar light illumination device as claimed in claim 1, wherein the controller controls the first and second light emitters of the first light emitting unit and the third and fourth light emitters of the second light emitting unit respectively or changes brightness of the first and second light emitters of the first light emitting unit and the third and fourth light emitters of the second light emitting unit respectively.

8. The planar light illumination device as claimed in claim 1, wherein the ALS is electrically connected with the controller in a wireless communication manner and transmits the first color-temperature signals to the controller.

9. The planar light illumination device as claimed in claim 1, wherein the ALS has a first wireless communicating unit, and the controller has a second wireless communicating unit which transmits signals to the first wireless communicating unit.

10. The planar light illumination device as claimed in claim 1 further comprising a color temperature sensor electrically connected with the micro controlling unit of the controller and configured to sense color temperature of the lights of the first light emitter, the second light emitter, the third light emitter, and the fourth light emitter from the light guiding plate, to convert the color temperature into a second color-temperature signal and to send the second color-temperature signal to the micro controlling unit, the micro controlling unit produces pulse width modulation (PWM) signal according to the second color-temperature signal sensed by the color temperature sensor, and an output mode of the converter is adjusted via the pulse width modulation (PWM) signal to automatically compensate colors of the lights.

11. The planar light illumination device as claimed in claim 1, wherein the controller controls a first light emitter and a second light emitter of a first light emitting unit and a third light emitter and a fourth light emitter of a second light emitting unit to operate and B based on a set time.

12. The planar light illumination device as claimed in claim 1, wherein the controller controls a first light emitter and a second light emitter of a first light emitting unit and a third light emitter and a fourth light emitter of a second light emitting unit to change brightness of the first light emitter, the second light emitter, the third light emitter, the fourth light emitter based on a set time.

* * * * *